United States Patent
Sobota et al.

(10) Patent No.: US 10,279,356 B2
(45) Date of Patent: May 7, 2019

(54) LABORATORY CENTRIFUGE WITH A DAMPING DEVICE

(71) Applicant: Sigma Laborzentrifugen GmbH, Osterode (DE)

(72) Inventors: Oliver Sobota, Bad Lauterberg (DE); Rudiger Peinemann, Osterode (DE)

(73) Assignee: SIGMA LABORZENTRIFUGEN GMBH, Osterode (DE)

(*) Notice: Subject to any disclaimer, the term of this patent is extended or adjusted under 35 U.S.C. 154(b) by 441 days.

(21) Appl. No.: 15/172,527

(22) Filed: Jun. 3, 2016

(65) Prior Publication Data
US 2016/0361726 A1 Dec. 15, 2016

(30) Foreign Application Priority Data
Jun. 12, 2015 (EP) .................... 15171826

(51) Int. Cl.
   *B04B 7/02* (2006.01)
   *F16F 7/06* (2006.01)
(52) U.S. Cl.
   CPC ............... *B04B 7/02* (2013.01); *F16F 7/06* (2013.01); *B04B 2007/025* (2013.01)
(58) Field of Classification Search
   CPC ......... B04B 7/02; B04B 2007/025; F16F 7/06

USPC .................................................. 220/200, 252
See application file for complete search history.

(56) References Cited

U.S. PATENT DOCUMENTS

| 2003/0220181 A1 | 11/2003 | Hall et al. |
| 2007/0072759 A1 | 3/2007 | Hayasaka et al. |
| 2014/0329659 A1 | 11/2014 | Le Guyader et al. |

FOREIGN PATENT DOCUMENTS

CN         203140176 U   *   8/2013

OTHER PUBLICATIONS

CN 203140176 Description Espacenet Machine Translation.*

* cited by examiner

*Primary Examiner* — Walter D. Griffin
*Assistant Examiner* — Shuyi S. Liu
(74) *Attorney, Agent, or Firm* — Thomas | Horstemeyer, LLP

(57) ABSTRACT

The invention relates to a laboratory centrifuge. The laboratory centrifuge comprises a base body (2). The lid (3) is linked to the base body (2) for being pivoted about a pivot axis (6). A damping device (38) damps the pivoting movement of the lid (3), in particular when the lid (3) approaches a maximum opening angle. According to the invention, the damping device (38) bases upon friction between friction elements (23, 26).

22 Claims, 11 Drawing Sheets

LABORATORY CENTRIFUGE WITH A DAMPING DEVICE

CROSS REFERENCE TO RELATED APPLICATIONS

This application claims priority to co-pending European patent application No. EP 15 171 826.9 entitled "Laborzentrifuge mit Dämpfungseinrichtung", filed Jun. 12, 2015.

FIELD OF THE INVENTION

The invention relates to laboratory centrifuge. Furthermore, the invention relates to a damping device for a laboratory centrifuge.

Laboratory centrifuges of the present type are e.g. used in biotechnology, the pharmaceutical industry, medical industry and environmental analytics. A product (in particular a container or vessel with a sample or substance located therein) or a plurality of products of this type are centrifuged by a laboratory centrifuge with numbers of revolutions of more than 3,000 rev/min (e.g. more than 15,000 rev/min). It is intended that due to the centrifugation accelerations acting upon the product are produced which might e.g. exceed 15,000×g (in particular exceed 16,000×g, 20,000×g up to more than 60,000×g). By means of the centrifugation it is intended to separate a material mixture formed by the sample or substance into components of different mass densities. Dependent on the chemical and/or physical properties of the mixture of materials, it is possible that the pressure and/or temperature conditions are specifically controlled during the centrifugation additionally. To mention only some examples, a laboratory centrifuge might be used together with a polymerase-chain-reaction (PCR), with the determination of a hematocrit, with cytological studies or with the centrifugation of microtiters, blood bags, mineral oil vessels or blood vessels.

BACKGROUND OF THE INVENTION

Generally, laboratory centrifuges comprise a base body and a lid which is linked to the base body for being pivoted about a pivot axis. In a closed position of the lid an inner chamber wherein at least a product to centrifuged is arranged is closed. Accordingly, it is possible to perform the centrifugation process and specifically provide a desired fluidic flow in the inner chamber and to specifically control the pressure and the temperature in the inner chamber. In a maximum opening position of the lid it is possible to gain access to the inner space of the laboratory centrifuge so that it is possible to insert the product to be centrifuged into the inner chamber and to remove a product from the inner chamber which has already been centrifuged.

The company Sigma Laborzentrifugen GmbH distributes laboratory centrifuges under the label "2-16 KL". In these laboratory centrifuges a damping device acts between the lid and the base body. Here, the damping device is formed by a gas-filled damper. By means of the gas-filled damper, it is possible to design the opening and closing characteristic of the lid by constructive measures. The gas-filled damper comprises an end position damping which becomes effective when approaching the maximum opening angle of the lid.

SUMMARY OF THE INVENTION

The invention proposes to form a damping device acting between the lid and the base body of the laboratory centrifuge with a friction element held at the base body and a friction element pivoted with the lid. The friction elements are pressed against each other with a normal force. By the pressing of the friction elements against each other, a friction force is produced between the friction elements, so between the base body and the lid. The friction force effects a damping. Here, the normal force and the produced friction force are not independent on the opening angle. Instead (with any dependency), the normal force (and so also the generated friction force) depends from the opening angle of the lid relative to the base body. Accordingly, the normal force and the friction force (so also the damping effect) change with a change of the opening angle To mention only some non-limiting examples, for at least one part of the opening angle there is no normal force and no friction force generated, whereas in at least one different part of the opening angle a constant normal force or a normal force depending on the opening angle and a corresponding friction force are generated. However, it is also possible that for any opening angle a normal force and a friction force are generated, wherein the amounts of the normal force and the friction force might depend on the opening angle. If the normal force changes in dependence on the opening angle, this might be the case with an at least piecewise linear or curved course of the normal force, a kink or a step of the course of the normal force in dependence on the opening angle.

The inventive damping device might alternatively or cumulatively use the following technical advantages and effects (without this necessarily being the case):

Without a damping device the movement of the lid into an end position (which might be a maximum opening position and/or the closed position) leads to an abrupt braking of the lid by the base body which might e.g. be caused by the hitting of a stop when reaching the maximum opening angle or the closed position. An impulse acting upon the base body caused in this way might have the consequence that there is an undesired remixing of the components of the sample previously separated by centrifugation. If according to the invention the damping device only produces a normal force and a friction force when approaching an end position or produces an increased normal force and friction force when approaching the end position, an impulse of this type is at least attenuated which results in an improved result of the centrifugation.

It is possible that by the damping device purposefully a haptic feedback is given to the user which manually pivots the lid when approaching a specific opening position of the lid. Accordingly, by the damping device with the generation of the friction force or an increased friction force it is possible to indicate to the user that an end position has been reached or will be reached shortly.

Whereas fluidic damping devices normally produce a damping force which is proportional to the velocity, with the use of a damping device basing upon a friction force it is possible to at least reduce the influence of the opening velocity upon the damping caused by the damping device.

It is generally possible that an opening or closing characteristic of the lid is influenced by further constructive measures besides that of the damping device. In order to mention only some non-limiting examples, the opening and closing characteristic might be influenced by any further damping element, a spring element acting between the lid and the base body and the eccentric position of the center of gravity of the lid with respect to the pivot axis of the lid. When using the inventive damping device basing upon a friction force, the options for influencing the opening and closing characteristic are extended.

It is also possible that by means of the damping device one or a plurality of stable opening angles or a multi-stable opening angle region of the lid is provided. A "multi-stable opening angle region" is only present if the lid due to the friction caused by the damping device remains in an opening angle (which has previously been effected by manipulation by the user and which is within the multi-stable opening angle region) also when the user no longer applies manual forces upon the lid. In this case, the friction of the damping device is able to compensate any gravitational force of the lid and other forces acting upon the lid as the force of an opening spring (if present). This is not possible for a fluidic damping device because for a fluidic damping device the lid due to its weight slowly moves from a manually caused opening position into the closed position.

By means of a damping device basing upon friction, dependent on the design of the friction conditions and the constructive design of the course of the normal force between the friction elements over the opening angle, it is possible to influence the opening and closing characteristic by constructive measures.

For the arrangement of the friction elements at the lid and the base body as well as for the orientation of the friction elements, within the frame of the invention there are a lot of different options. For one proposal of the invention, the normal force has an orientation parallel to the pivot axis. If the normal force does not change over the opening angle, the normal force has an orientation exactly parallel to the pivot axis. There might also be a slight inclination of the normal force relative to the pivot axis if a change of the normal force with a change of the opening angle is intended.

For another proposal of the invention, the normal force acts in a plane having an orientation transverse to the pivot axis. Here it is possible that in the case that it is intended that the normal force should remain constant with a change of the opening angle, the normal force has an orientation radial to the pivot axis. If a change of the normal force with a change of the opening angle is intended, a component of the normal force might be generated which act in the plane having an orientation transverse to the pivot axis but has an orientation in circumferential direction of the pivot axis.

Within the frame of the invention, any contact surfaces of the friction elements might be used. For one inventive design of the laboratory centrifuge, at least one friction element is formed with a helical surface which extends around the pivot axis. If a friction element contacts the friction element formed by the helical surface, the contact has the consequence that with a change of the opening angle the contact surface between the friction elements is displaced along the helical surface. For an elastic support of at least one friction element in the direction of the pivot axis, this movement along the helical surface leads to a change of the normal force with the change of the opening angle of the lid.

The pitch or inclination of the helical surface (which is the displacement of the helical surface along the pivot axis with a hypothetical complete turn around the pivot axis (circumferential angle 360°)) might be any pitch and might be a constant pitch or a varying pitch. For one embodiment of the invention, the pitch is 5 to 15 mm, in particular 8 to 12 mm which has shown to be advantageous under consideration of the technical reasonable friction pairs and the desired damping effect.

It is generally possible that one friction elements forms a helical surface whereas the other friction element which slides along the helical surface with a change of the opening angle is formed by a friction block, a friction pin (e.g. with a semi-spherical front surface or a front surface being inclined corresponding to the inclination of the helical surface) and the like. However, it is also possible that the two friction elements are formed by correspondingly pitched helical surfaces which results in a large contact surface between the friction elements in the region of the contacting helical surfaces and in some cases also to a changing contact surface with a change of the opening angle.

For another embodiment of the invention, one friction element is formed with a cam surface or an inner surface extending around the pivot axis. The distance of the cam surface or inner surface from the pivot axis changes in circumferential direction around the pivot axis. If a second friction element contacts the cam surface or inner surface, dependent on the change of the distance of the cam surface or inner surface from the pivot axis with a change of the opening angle the normal force between the friction elements changes. Also here it is generally possible that only one friction element is formed with a cam surface or inner surface, whereas the other element might be formed by any friction block, friction body or friction pin and the like which then interacts with the cam surface or inner surface. However, it is also possible that both friction elements are formed with a cam surface and/or inner surface which then interact with each other so that the change of the normal force results from the superposition of the changes of the distances of the two cam surfaces or inner surfaces from the pivot axis.

For another inventive embodiment, the laboratory centrifuge comprises a stop for limiting the pivoting movement, in particular for the definition of the maximum opening angle. Generally, the stop might become effective at any location at the lid and the base body, so also distant from the damping device and the friction element. For one proposal of the invention, the stop is formed with a stop surface. it is possible that this stop surface directly continues from to the cam surface or helical surface which might be the case with a curved transition, a kink or a step. For an alternative or cumulative embodiment it is possible that the stop is formed by a stop surface of the friction element so that the friction element is used in a multifunctional way. In order to mention only one non-limiting example, the friction element might on the one hand form a friction surface having a surface normal vector which (besides a certain inclination) has an orientation parallel to the pivot axis or which is lying in a plane having an orientation transverse to the pivot axis. On the other hand the friction element might form the stop by a stop surface having a surface normal vector with an orientation in circumferential direction of the pivot axis.

For the provision of the friction elements there are a lot of constructive options. One friction element might e.g. be integrally formed by the base body or the lid. However, for one proposal of the invention the friction element held by the base body is formed by a friction element body which is mounted to a bearing block of the base body. For this design it is e.g. possible that for a wear of the friction element in a simple fashion the friction element body can be exchanged. In some cases the separate design of the friction element body also leads to a simplified assembly and/or disassembly of the lid with and from the base body. It is also possible that by use of different friction elements bodies different opening and closing characteristics can be achieved (in some cases also with different stops for defining different maximum opening angles).

It is also possible that the friction element which is pivoted with the lid is formed by a friction element body which is assembled to the lid.

For a further proposal of this solution the friction element body which forms the friction element being pivoted with the lid integrally forms a bearing stud for the bearing for providing the pivoting movement of the lid so that in this case the friction element body is used in a multifunctional way.

For the choice of the material of the friction element or the friction element body as well as for the process used for manufacturing there are also a lot of options. For one embodiment of the invention, the friction element pivoted with the lid is made of metal, in particular aluminum, and a milled part. It is possible that in this case the friction element or the friction element body held by the base body is made of plastic, in particular of POM, wherein in this case it is also possible that the friction element body is injection-molded. The material POM (polyoxymethylene, also named polyacetal, polyformaldehyde or only acetal) is a high-molecular thermoplastic plastic material having a high stiffness, low friction values and a high dimensional stability and thermal stability. The choice of the materials plastic and metal for the friction pair has shown to be of advantage for the damping characteristic of the damping device formed therewith. On the other hand, in some cases for this choice of the friction materials an additional lubrication is not required which is required in some other cases for a purely metallic contact. In some cases the choice of the material metal for the friction element pivoted with the lid is e.g. advantageous if the friction element body which forms this friction element integrally also forms the bearing lug which requires an increased stiffness.

Dependent on the shape of the friction elements and the arrangement of the friction elements at the base body respectively at the lid, any opening and closing characteristic might result which is preferably influenced by the opening angle for which the friction elements contact each other and by the change of the normal force between the friction elements with a change of the opening angle. For one proposal of the invention the friction elements are arranged with a distance from each other for an opening angle being smaller than a partially opened angle defined by constructive measures so that here there is no normal force. For an opening angle of this type it is possible to move the lid without an influence of the frictional damping device upon the opening and closing characteristic. However, if the opening angle equals the afore mentioned partially opened angle, the friction elements for the first time get into contact with each other. If the opening angle becomes larger than the afore mentioned partially opened angle, the friction elements are pressed against each other with a (constant or varying) normal force. The afore mentioned partially opened angle might e.g. be in the range of 50 to 80% (in particular 55 to 70% or 58 to 64%) of the maximum opening angle. To mention only one example, the maximum opening angle might be 75°±5°, whereas the partially opened angle for which the friction elements for the first time contact each other might be 46°±3°.

For a preferred embodiment the normal force between the friction elements increases when approaching a maximum opening angle and/or when approaching a stop.

For the inventive damping device the friction elements are directly or indirectly elastically supported. The normal force is here generated by use of the elastical support. Here, the required elasticity might be provided by an additional spring element supporting the friction element. The spring element might e.g. be an elastomeric body interposed between the friction element and the lid or the friction element and the base body or might be a common spring. Here it is possible that the friction element pivoted with the lid and/or the friction element held at the base body are/is elastically supported. For one specific proposal of the invention, the friction element which is pivoted with the lid is supported at an elastical region of the lid. It is possible that here the material thickness and form as well as the cross-section of the lid is chosen such that the lid is resilient in this region so that the friction element is able to elastically deflect. It is possible that the lid in the region of the support of the friction element is specifically equipped with a weakening, a cutting or incision and the like in order to provide the deflecting movement of the friction element. Here, the elasticity of the elastic support of the friction element is adapted to an inclination of any helical surface or a change of the distance of a cam surface or inner surface from the pivot axis in order to provide the desired dependency of the normal force from the opening angle.

Another solution of the object of the invention is provided by a damping device of a laboratory centrifuge as described before. Here the damping device comprises two friction elements each formed by a friction element body. Here one friction element body comprises an assembly region for assembling the friction element body to a lid of the laboratory centrifuge. In order to mention only one non-limiting example, the friction element body might comprise bores or threaded bores by which it is possible to screw the friction element body to the lid. The other friction element body comprises an assembly region by which it is possible to assemble the friction element body to a base body of the laboratory centrifuge. In order to mention only one non-limiting example, the friction element body might comprise a shape which is insertable along the pivot axis of the lid into a recess of a bearing block of the base body with the generation of a positive form lock between the bearing block and the friction element body in circumferential direction.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

Other features and advantages of the present invention will become apparent to one with skill, in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
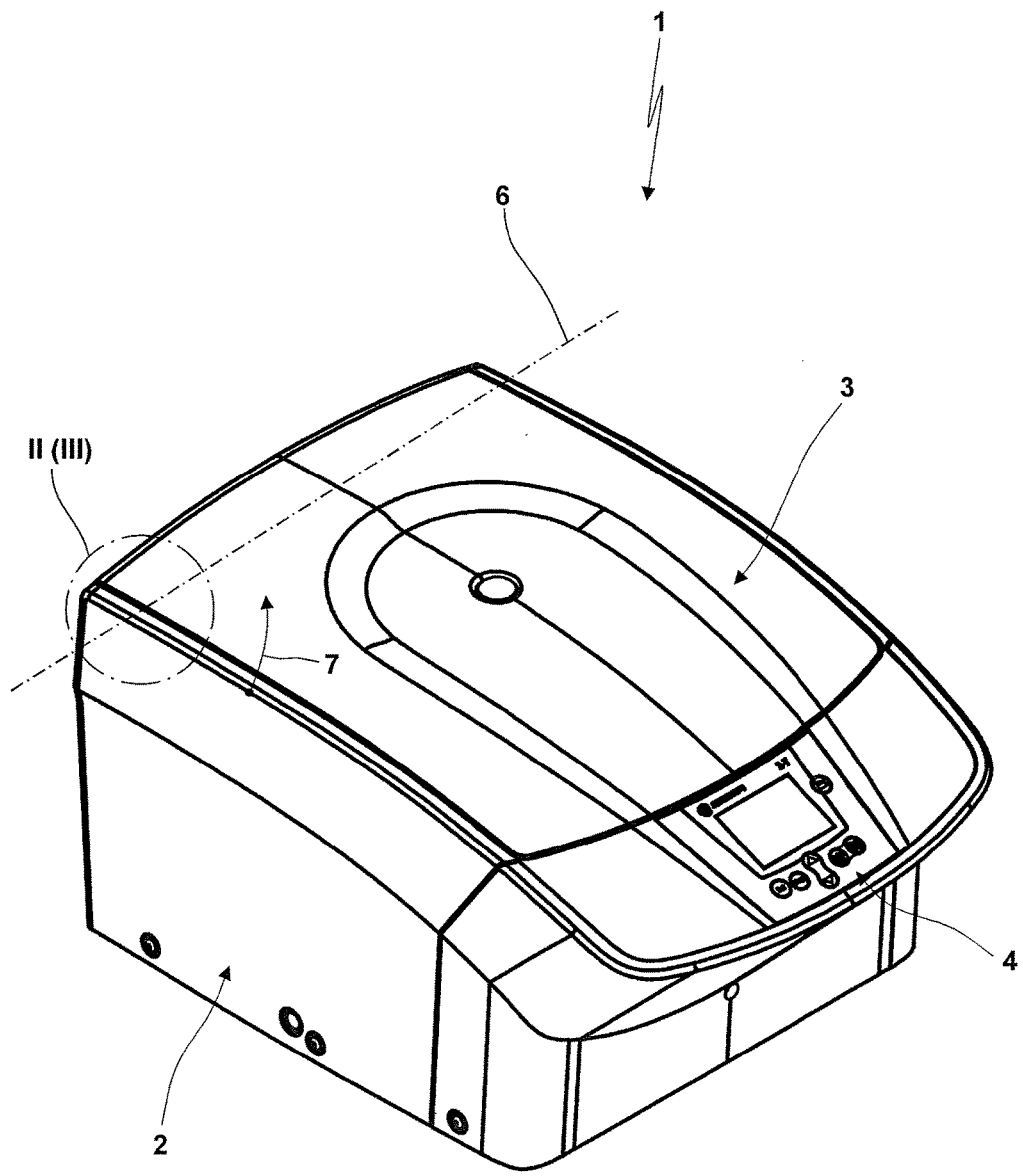
FIG. 1 shows a laboratory centrifuge in a three-dimensional view taken from an angle from the left front, a lid being in a closed position.

FIG. 1 shows a laboratory centrifuge 1 formed with a base body 2 and a lid 3. In generally known fashion the base body 2 comprises a control panel and display 4 here located in the region of the upper side, a drive connected to a driving journal for a rotor of the centrifuge, electrical power ports, an aerating and deaerating system, a heating device, an interface for a connection to other devices and the like. The base body 2 forms an inner chamber which is open in upper direction. It is possible to introduce products, a sample container and/or a centrifuge container into the inner chamber where these are coupled to a rotor. In upper direction the inner chamber is closed by the lid 3. For the embodiment here shown, the lid 3 extends only in the region of the upper side of the laboratory centrifuge 1 behind the control panel and display 4. FIG. 1 shows the lid 3 in its closed position. In the rear end region the lid 3 is supported at the base body 2 for being pivoted about a pivot axis 6 having a horizontal orientation. With a pivoting movement of the lid 3 about the pivot axis 6 from the closed position in FIG. 1 (wherein the lid 3 has approximately a horizontal orientation or a slightly inclined orientation towards the front side) in upper direction under an increase of the opening angle 7 it is possible to gain access to the inner chamber of the laboratory centrifuge 1.

Figure 2:
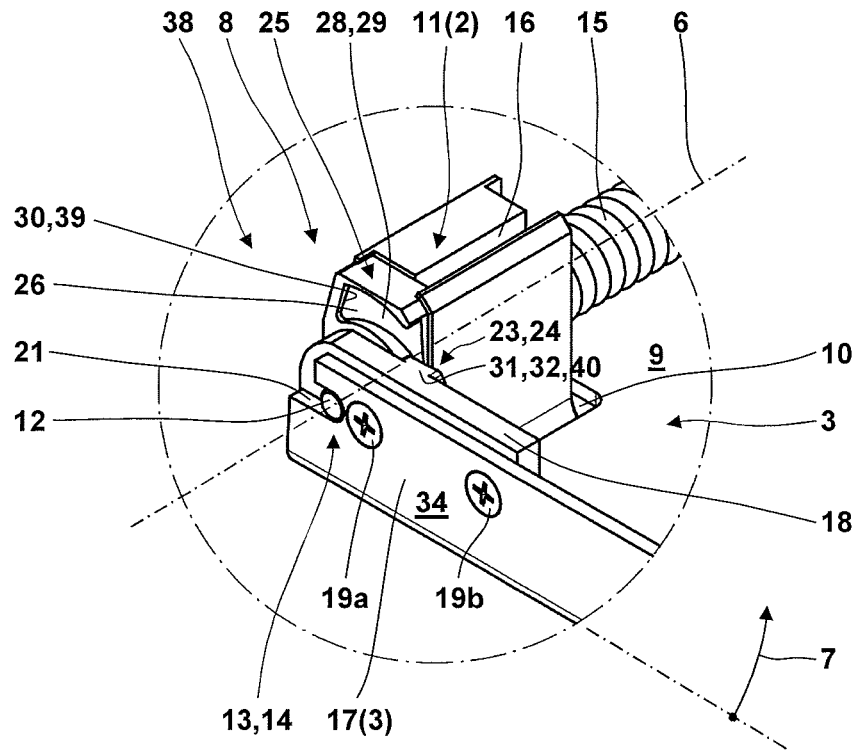
FIG. 2 shows in a partially disassembled state a detail II of the laboratory centrifuge according to FIG. 1 in the closed position of the lid.
Figure 3:
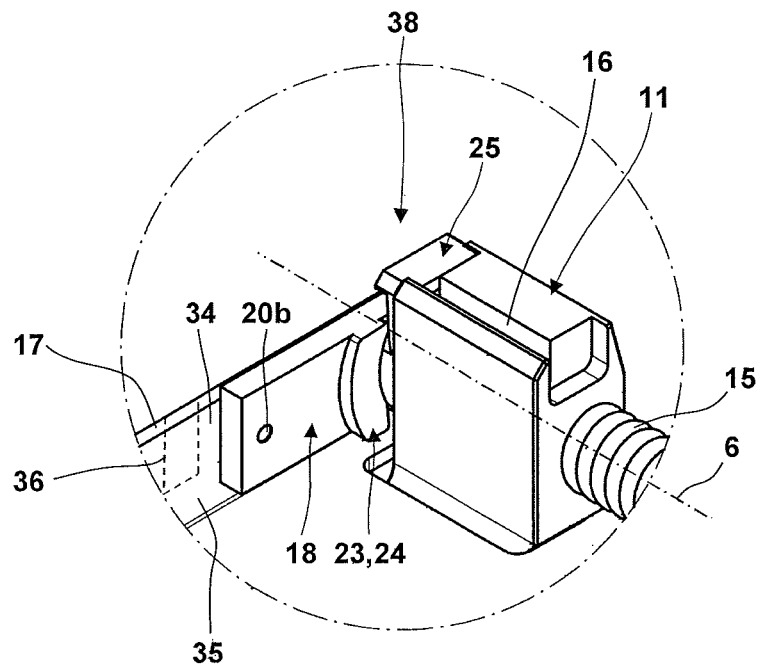
FIG. 3 shows a detail corresponding to FIG. 2 with a view taken from an angle from the right front.
Figure 4:
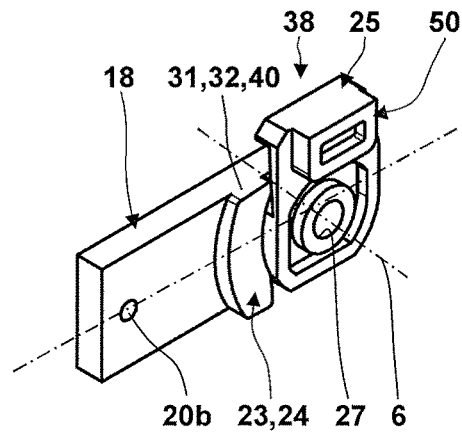
FIGS. 4 to 6 show friction element bodies of a damping device for different opening angles (closed position FIG. 4, partially opened angle FIG. 5 and maximum opening angle FIG. 6) and for different viewing directions.

FIG. 2 in the detail II according to FIG. 1 shows the bearing region 8 for the pivotable bearing of the lid 3 at the base body 2. The lid 3 has a shell-like design with an upper shell and a lower shell, wherein an inner space is formed between the upper shell and the lower shell. In FIG. 2 the lid 3 is shown in a partially disassembled state with removed upper shell so that it is only possible to see a lower lid part 9 formed by the lower shell. The lid part 9 comprises a rectangular recess 10. A bearing block 11 held at the base body 2 extends vertically in upper direction through the recess 10. The bearing block 11 forms a bearing for a journal 12. Together with a bearing lug 13 formed by the lid 3 or held by the lid 3 the journal 12 forms a pivot bearing 14. It is possible that the journal 12 is a part of a bearing shaft which protrudes on one side from the bearing block 11 and which extends through a spirally-shaped torsional spring 15 for guiding the same. A spring base of the torsional spring 15 is housed in a recess or groove 16 of the bearing block 11 under the provision of a positive form lock in circumferential direction around the pivot axis 6. The other spring base of the torsional spring 15 is fixed to the lid or supported at the lid in circumferential direction around the pivot axis 6. It is possible that in the closed position of the lid 3 the torsional spring 15 is pretensioned such that with a release of a lock of the lid 3 the lid 3 automatically moves or bounces into an open position. Here, in the open position the weight of the lid 3 (which acts eccentrically to the pivot axis 6 in the center of gravity of the lid 3) is supported by the torsional spring 15.

In the lateral edge region the lid 3 comprises a side wall or strut 17 having a longitudinal axis with an orientation radial to the pivot axis 6. For the shown embodiment the side wall or strut 17 has a plate-like or band-like design with a main extensional plane vertical to the pivot axis 6. A friction element body 18 is assembled to the lid 3, here to the side wall or strut 17, and fixed which is for the shown embodiment done by screws 19a, 19b. The screws 19a, 19b extend parallel to the pivot axis 6 through bores of the side wall or strut 17. The screws 19a, 19b are screwed into threaded bores 20a, 20b of the friction element body 18.

The friction element body 18 together with the side wall or strut 17 forms the bearing lug 13 for the journal 12. By unthreading the screws 19 it is possible to open the bearing lug 13. For this purpose the side wall or strut 17 comprises a bearing slit 21 in the shown end region. the bearing slit 21 is open on one side. For the assembly the journal 12 is introduced from the open end into the bearing slit 21 until the journal 12 contacts with its outer surface a half cylindrical end of the bearing slit 21. The friction element body 18 also comprises a bearing slit 22 which has an inclination of 90° relative to the bearing slit 21 if the friction element body 18 is assembled to the side wall or strut 17. Accordingly, a lateral limitation 5 of the bearing slit 22 of the friction element body 18 blocks the exiting of the journal 12 from the bearing slit 21 of the side wall or strut 17. The contour shape and the dimensions of the bearing slits 21, 22 are chosen such that a smooth pivoting movement of the lid 3 with the side wall or strut 17 and the friction element 18 relative to the journal 12 is possible. In the case that the journal 12 is supported in the bearing block 11 for being rotated, it is possible that the journal 12 can also be clamped between the side wall or strut 17 and the friction element body 18 and that the journal 12 is fixed in this way.

On the side facing towards the bearing block lithe friction element body 18 forms a friction element 23. For the embodiment shown in FIGS. 2 to 6 the friction element 23 comprises a helical surface 24. The helical surface 24 helically extends around the pivot axis 6 so that the distance of the helical surface 24 from the bearing block 11 changes in circumferential direction. In a projection of the helical surface 24 into a plane having an orientation transverse to the pivot axis 6 the helical surface 24 has the shape of a segment of a circular ring. The circumferential angle of the segment of the circular ring is smaller than 90°, in particular smaller than 70°.

A friction element body 25 is fixed to the bearing block 11. The friction element body 25 forms another friction element 26 which is held at the base body 2. For the shown embodiment the bearing block 11 comprises a recess. It is possible to insert a protrusion 50 of the friction element body 25 into the recess with an inserting direction parallel to the pivot axis 6. By the protrusion 50 the friction element body 25 is fixed in the recess with a positive form lock in circumferential direction. The friction element body 25 comprises a bore 27 through which the journal 12 extends in the assembled state. On the side facing towards the friction element 23 the friction element body 25 comprises a groove 28. The bottom of the groove 28 is not planar and not located in a plane having an orientation transverse to the pivot axis 6. Instead, the bottom of the groove 28 has an inclination relative to this plane, wherein the inclination angle corresponds to the inclination of the helical surface 24. In a projection of the groove 28 into a plane having an orientation transverse to the pivot axis 6 the groove 28 has the shape of a segment of a circular ring wherein the circumferential angle of the segment of the circular ring is smaller than 90°, in particular smaller than 70°. The distance of the groove 28 from the pivot axis 6 and the width of the groove 28 are chosen such that the friction element 23 is able to enter into the groove 28 with a play or gap on the radial inner and outer side when increasing the opening angle 7. The bottom of the groove 28 forms a helical surface 29 wherein the inclination or pitch of the helical surface 29 corresponds to the inclination or pitch of the helical surface 24. The groove 28 is open on one side. With an increase of the opening angle 7 the friction element 23 is able to enter via this opening into the groove 28. In the opposite end region the groove 28 is closed under the formation of a stop 30 formed by a stop surface. For the maximum opening angle 37 a front surface 31 of the friction element 23 (which forms a stop surface 40 of a stop 32) abuts the stop 30.

Figure 5:
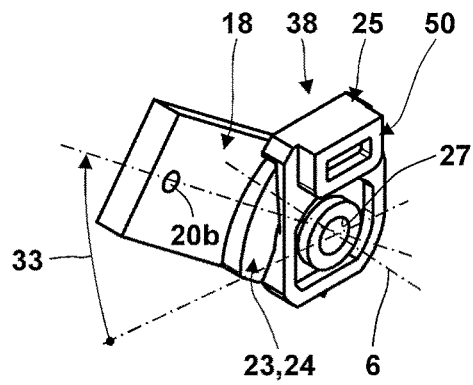
Figure 6:
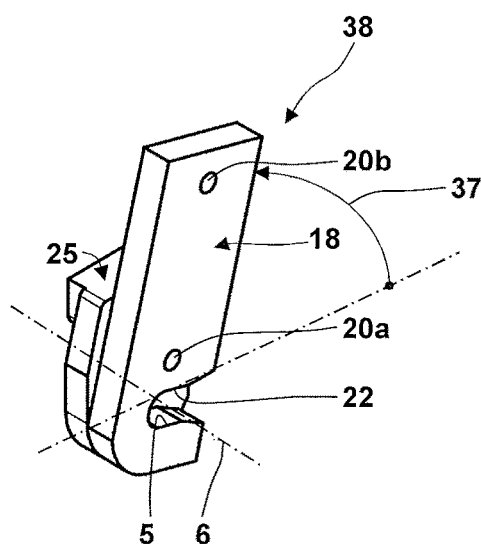

If the lid 3 is in the closed position according to FIGS. 1 to 4, the friction element 23 is located in front of the groove 28 (when seen in circumferential direction around the pivot axis 6). With a movement of the lid 3 and so of the side wall or strut 17 and of the friction element body 18 in opening direction under an increase of the opening angle 7 the friction element 23 approaches the groove 28 and finally enters into the groove 28. During this movement in the beginning there is no contact between the helical surfaces 24, 29. When arriving at a partially opened angle 23, the helical surface 24 comes into contact with the helical surface 29 (c.p. FIG. 5). Due to the inclination or pitch of the helical surfaces 24, 29 and the relative movement of the same a further increase of the opening angle 7 leads to an increase of the normal force between the helical surfaces 24, 29, wherein at least one support of a friction element 23, 26 is elastically. For the shown embodiment an elastical region 34 is formed in the region of the side wall or strut 27. The elastical region 34 provides that the helical surface 24 is able to give way when being biased. With the elastical bias the normal force between the helical surfaces 24, 29 increases. In some cases the side wall or strut 17 is purposefully formed with a weakened material region 35, e.g. by an incision or cutting 36 shown in dashed line in FIG. 3. FIG. 6 shows the maximum opening angle 37 for which the normal force between the helical surfaces 24, 29 has reached its maximum. When arriving at the maximum opening angle 37, the friction element 23 has completely entered into the groove 28 so that the stop 32 formed by the friction element 23 abuts the end sided stop 30 formed by the groove 28. In this way the maximum opening angle 37 is defined. For the increase of the opening angle 7 from the partially opened angle 33 to the maximum opening angle 37 successively the normal force acting between the helical surfaces 24, 29 increases. Due to the fact that with an increase of the opening angle 7 the friction element 23 more and more enters into the groove 28, also the contact surface and friction surface formed between the helical surfaces 24, 29 increase. The friction elements 23, 26 form a damping device 38 basing upon friction.

A damping moment or torque which is applied upon the lid 3 by the damping device 38 due to the preferable dry friction is preferably larger than a damping moment due to other rigid body friction which might occur e.g. in the region of a bearing and in some cases between different windings of the torsional spring 15. Preferably, a damping moment of this type of the damping device 38 is by the factor 5 or 10 larger than the friction of other parts basing upon dry friction occurring when moving the lid 3 relative to the base body 2.

For the shown embodiment the stops 30, 32 are formed by stop surfaces 39, 40. Here, the stop surface 39 of the stop 30 is formed by a lateral limitation of the groove 28 which directly (in particular with a transition by a kink) follows to the helical surface 29. Instead, the stop surface 40 of the stop 32 is formed by the front side 31 which directly (here also under the formation of a kink) transits into the helical surface 24.

Figure 7:
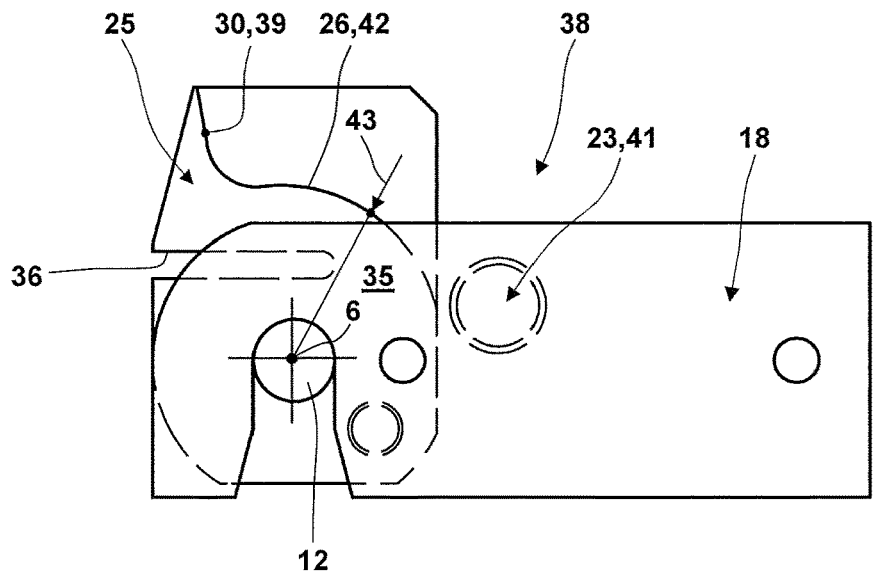
FIGS. 7 to 9 show another embodiment of friction element bodies of a damping device for different opening angles (closed position FIG. 7, partially opened angle FIG. 8 and maximum opening angle FIG. 9).
Figure 8:
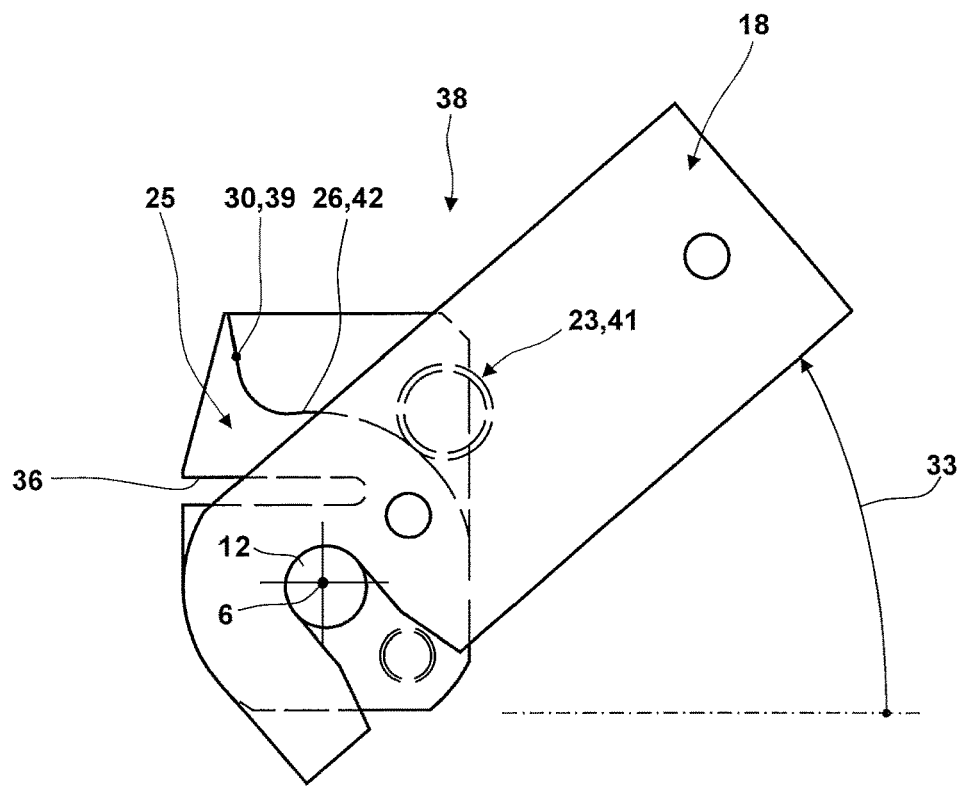
Figure 9:
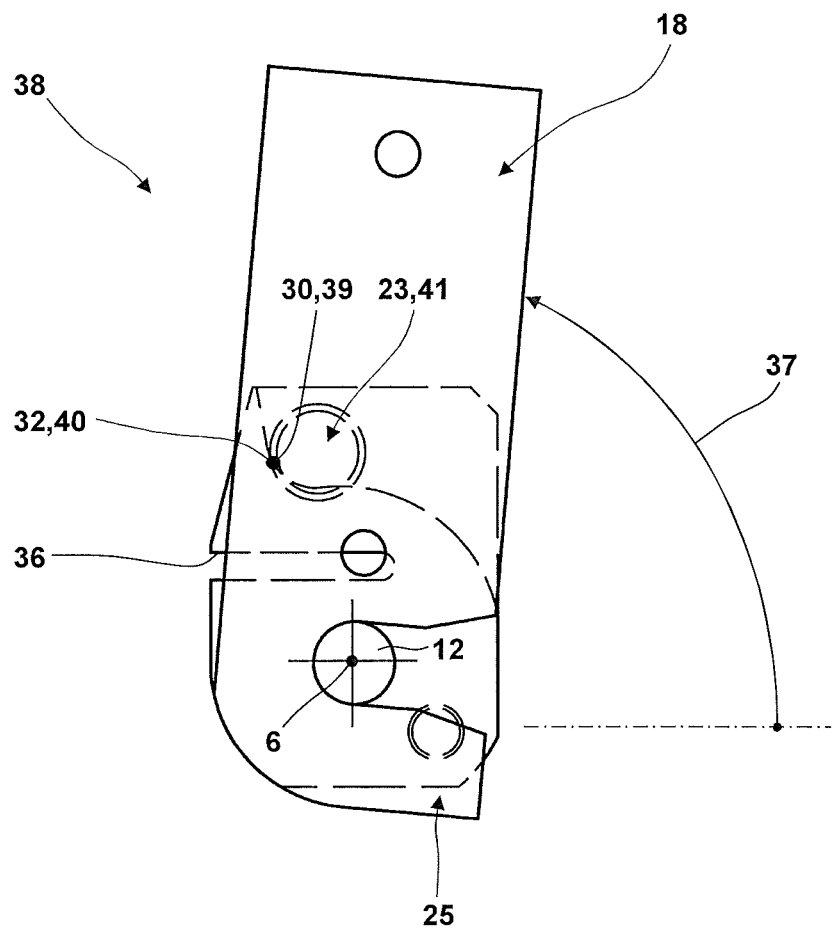

For the embodiment according to FIGS. 2 to 6 the normal force has an orientation generally parallel to the pivot axis 6. However, due to the inclination or pitch of the helical surfaces 24, 29 also a component of the normal force having an orthogonal orientation results. Instead, FIGS. 7 to 9 show an embodiment of the damping device 38 wherein the normal force has primarily an orientation radial to the pivot axis 6 and the normal force is lying in a plane having an orientation transverse to the pivot axis 6. In FIGS. 7 to 9 the damping device 38 is only shown with the two friction element bodies 18, 25 with a viewing direction along the pivot axis 6 so that here the pivot axis 6 has an orientation vertical to the drawing planes. In this case the friction element body 18 carries a friction element 23 which is formed by a stud 41 having an orientation parallel to the pivot axis and protruding in inner direction. In the figures the stud 41 is shown with dotted line. The friction element 26 of the friction element body 25 is in this case formed with a cam surface 42. The distance 43 of the cam surface 42 from the pivot axis 6 changes in circumferential direction.

In the closed position according to FIG. 7 the friction element 23 is not in contact with the cam surface 42 so that for an increase of the opening angle 7 in the beginning the damping device 38 does not generate a friction force. FIG. 8 shows the damping device 38 with the arrival at the partially opened angle 33 for which the friction element 23 for the first time contacts the cam surface 42. Due to the increase of the distance 43 of the cam surface 42 from the pivot axis 6, a further increase of the opening angle 7 leads to the result that the normal force between the friction element 23 and the cam surface 42 increases so that in increasing damping frictional force is provided by the damping device 38. Any changes of the distance 43 of the cam surface 42 from the pivot axis 6 are possible so that any development and change of the friction force providing the damping might be provided in dependence on the opening angle 7. The cam surface 42 directly (here by a rounding with a curvature preferably corresponding to the curvature of the outer surface of the stud 42) continues into the stop surface 39 for building the stop 30.

It can be seen in FIGS. 7 to 9 that for this embodiment the friction element body 25 comprises a weakened material region 35 due to a cutting and incision 36 so that with an increase of the normal force between the friction element 223 and the cam surface 42 the cam surface 42 is able to elastically give way.

Figure 10:
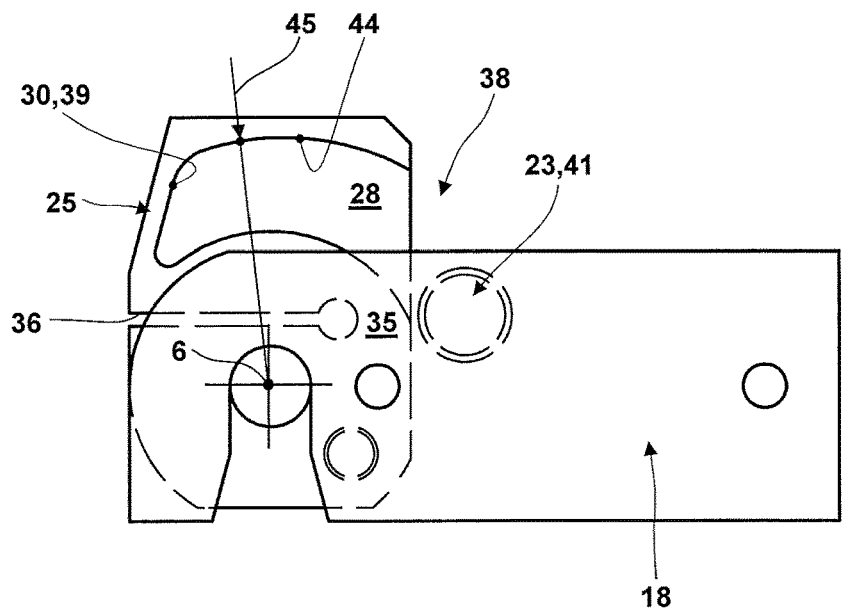
FIGS. 10 to 12 show another embodiment of friction element bodies of a damping device for different opening angles (closed position FIG. 10, partially opened angle FIG. 11 and maximum opening angle FIG. 12).
Figure 11:
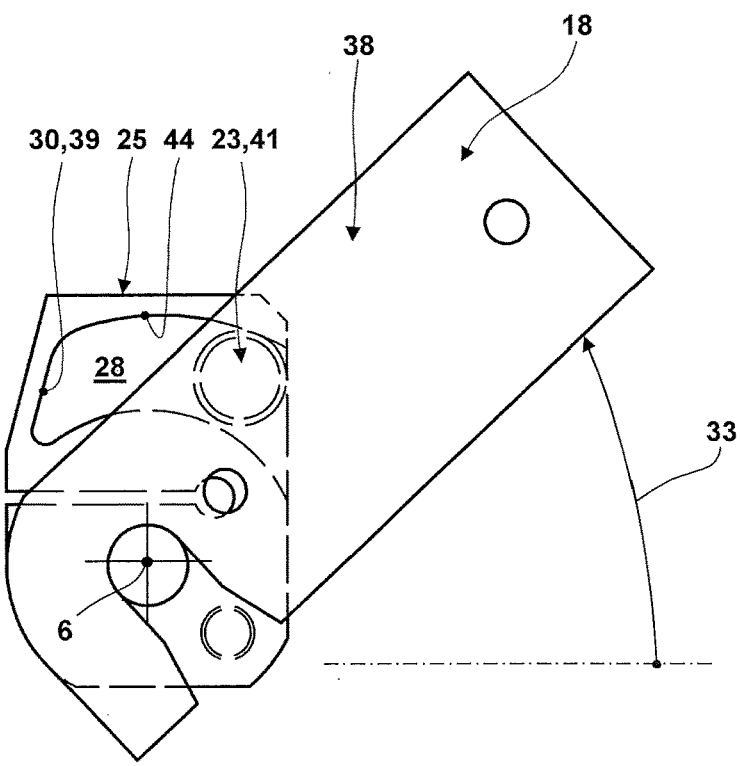
Figure 12:
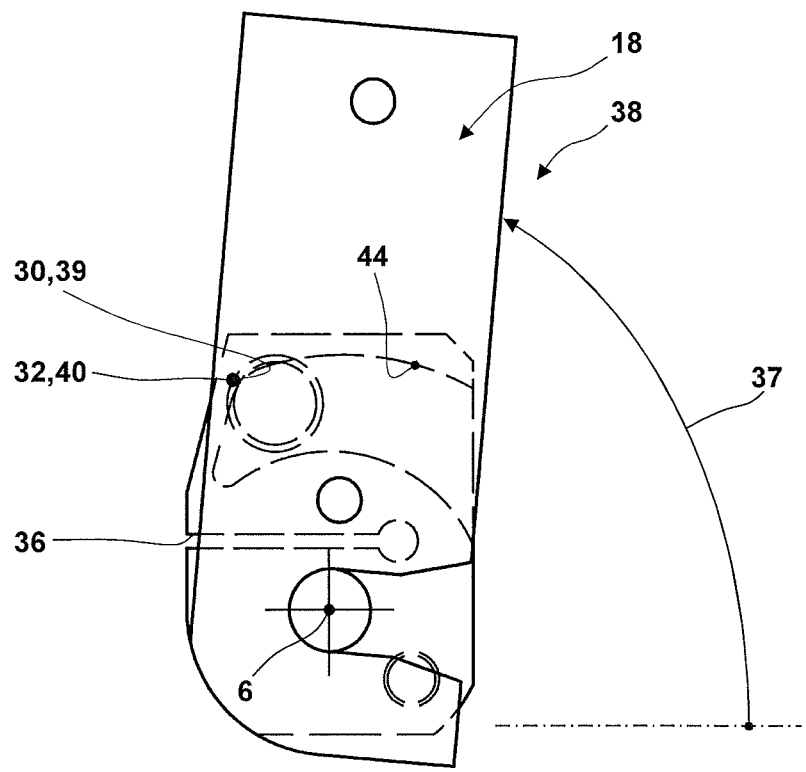

According to FIGS. 7 to 9 the friction contact between the friction element 23 and a cam surface 42 is formed on the radial inner side of the friction element 23 with respect to the pivot axis 6. Instead, FIGS. 10 to 12 show an embodiment wherein the friction contact is formed on the radial outer side at the friction element 23 relative to the pivot axis 6. For this purpose the friction element body 25 comprises an inner surface 44 having a distance 45 which continuously changes in circumferential direction from the pivot axis 6.

In the closed position according to FIG. 10 the here stud-shaped friction element 23 does not establish a contact with the inner surface 44. When arriving at the partially opened angle 33 according to FIG. 11, at the outer side the friction element 23 comes in contact with the inner surface 44. A further increase of the opening angle 7 results in a increasing, here continuous increase of the normal force between the friction element 23 and the inner surface 44 so that an increasing damping friction force is caused. In the maximum opening position 37 according to FIG. 12 the normal force and the friction force have reached their maximum. The stud 41 which here forms a stop surface 40 for providing the stop 32 contacts a stop surface 39 of the friction element body 25. The stop surface 39 of the friction element body 25 here directly follows to the inner surface 44, in particular with a rounding having a radius corresponding to the radius of the stud 41. For the shown embodiment the inner surface 44 is formed by a lateral limitation of a groove 28 without this necessarily being the case. Also here the friction element body 25 purposefully comprises a weakened material region 35 due to a cutting or incision 36.

Figure 13:
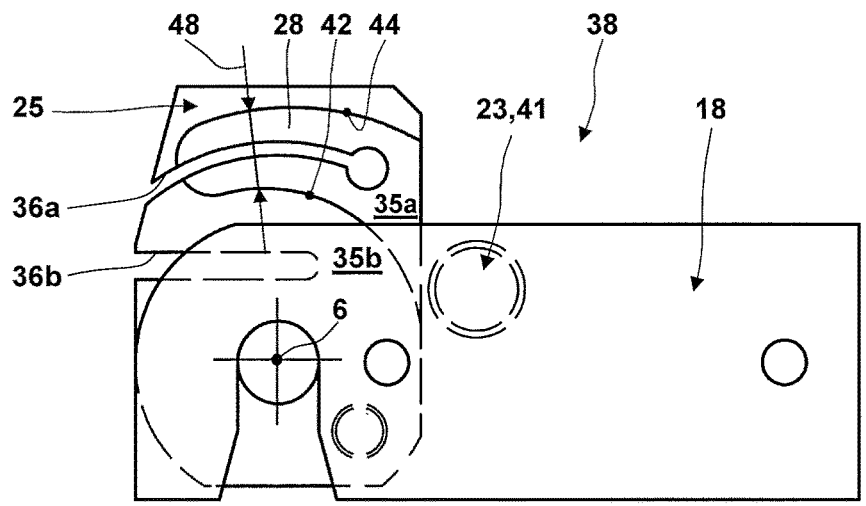
FIGS. 13 to 15 show another embodiment of friction element bodies of a damping device for different opening angles (closed position FIG. 13, partially opened angle FIG. 14 and maximum opening angle FIG. 15).
Figure 14:
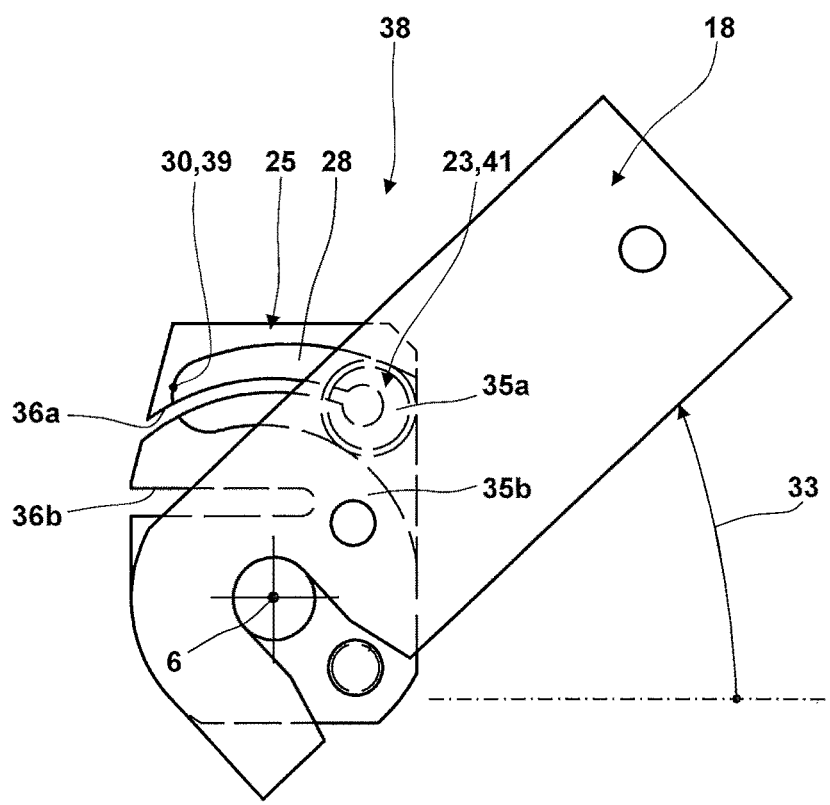
Figure 15:
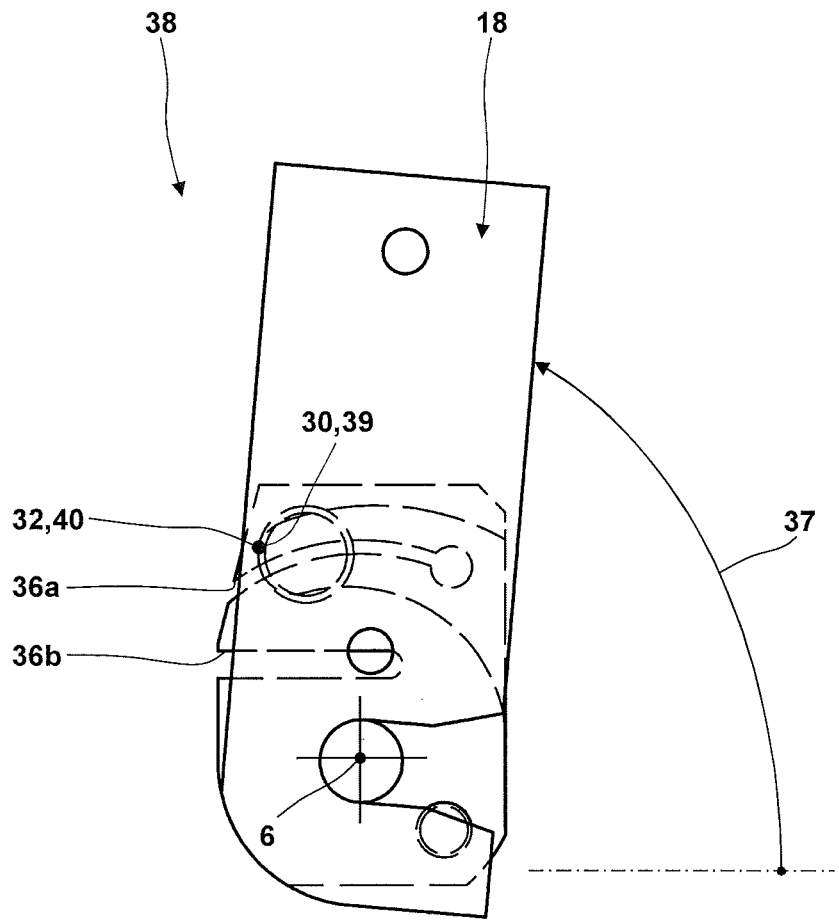

For the embodiment shown in FIGS. 13 to 15 the damping device 38 is formed with a groove 28 having a groove width 45 narrowing in opening direction. Due to the narrowing, the groove width 48 becomes smaller than the dimension of the friction element 23 in the region in which the friction element 23 enters into the groove 28. Said in different words, the narrowing groove 28 forms a cam surface 42 with the radial inner limitation of the groove 28, whereas the radial outer limitation of the groove 28 forms an inner surface 44. The friction element body 25 is formed with a weakened elastically deformable material region 35 which results from a cutting or incision 36.

In the closed position of the lid 3 according to FIG. 13 the friction element 23 does not contact the lateral limitations of the groove 28, so the cam surface 42 and the inner surface 44. When arriving at the partially opened angle 33 according to FIG. 14, the friction element 23 comes into contact with the cam surface 42 and/or the inner surface 44. A further increase of the opening angle 7 leads (due to a "clamping" of the friction element 23 in the narrowing groove 28) to an increase of the normal force of the friction element 23 on the one hand with the cam surface 42 and on the other hand with the inner surface 44. Accordingly, also the damping frictional force increases. Due to the weakened elastical material region 35, the groove 28 performs an elastical opening movement. For an alternative or cumulative embodiment, the friction element 23 is elastical. When reaching the maximum opening angle 37 according to FIG. 15, the stop surface 40 formed by the friction element 23 abuts the stop surface 39 formed by the closed end region of the groove 28. It is possible that a plurality of incisions 36a, 36b are provided for providing a plurality of weakened elastical material regions 35a, 35b.

Figure 16:
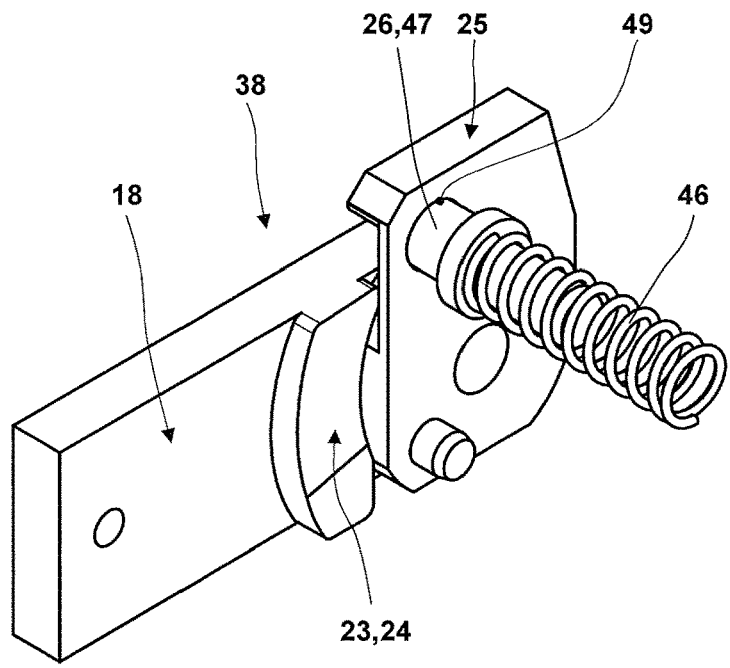
FIGS. 16 to 18 show another embodiment of friction element bodies of a damping device for different opening angles (closed position FIG. 16, partially opened angle FIG. 17 and maximum opening angle FIG. 18).
Figure 17:
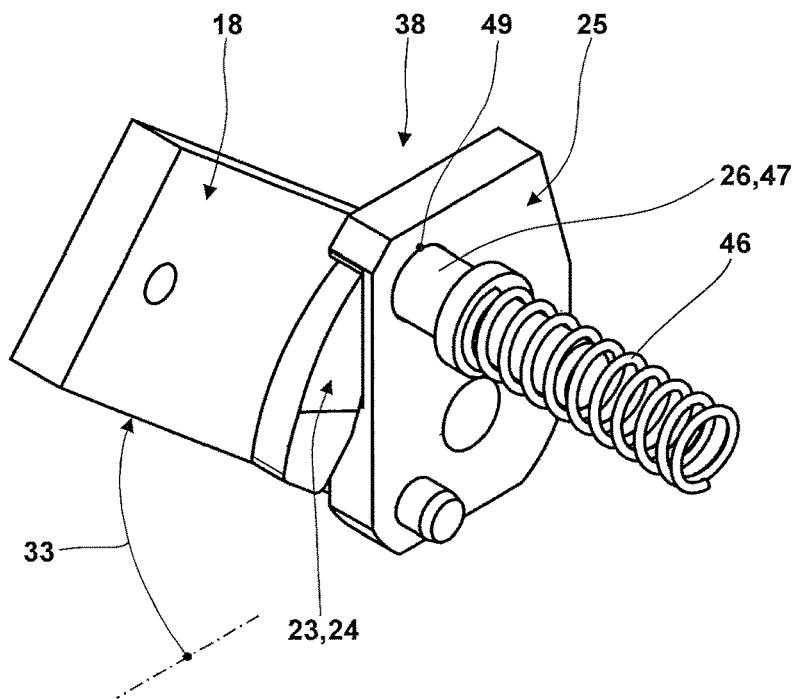
Figure 18:
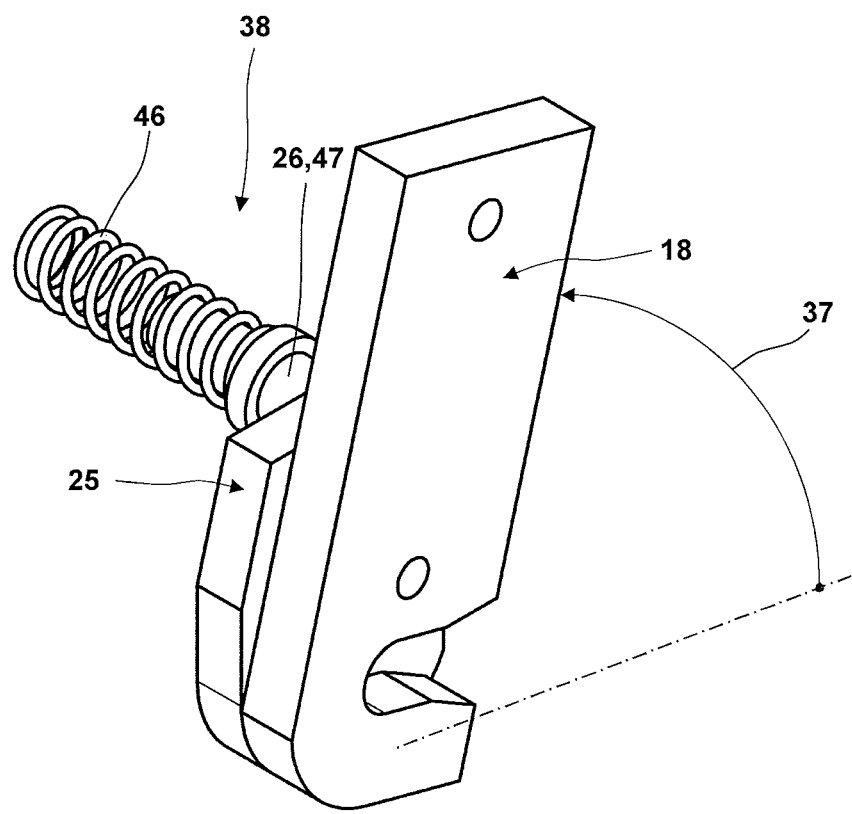

In FIGS. 16 to 18 another embodiment of a damping device 38 is shown wherein the friction element body 18 pivoted together with the lid has a design corresponding to the embodiment of FIGS. 2 to 6. However, in this case the elasticity for generating the normal force between the friction elements 23, 26 is not (completely) provided by the elasticity of the lid 3, in particular by the side wall or strut 17. Instead, in the friction element body 25 a friction element 26 is used which is guided for being moved parallel to the pivot axis 6 relative to the friction element body 25 under the bias of a spring 46. For the shown embodiment the friction element 26 is formed by a friction pin 37 which is guided in a bore 49 of the friction element body 25 for being moved in a direction parallel to the pivot axis 6. Here, it is possible that the front side of the friction pin 47 facing towards the helical surface 24 of the friction element body 18 is slanted corresponding to the inclination of the helical surface 24 or rounded or the like.

In the closed position of the lid according to FIG. 16 the front side of the friction pin 37 is out of contact with the helical surface 24. The contact is established when arriving at the partially opened angle 33 according to FIG. 17. For a further increase of the opening angle 7 the helical surface 24 of the friction element 23 to an increased extent presses the friction pin 47 against the bias of the spring 46. Accordingly, in dependence on the spring stiffness of the spring 46 and the inclination of the helical surface 24 the normal force between the friction pin 47 and the helical surface 24 is increased which also leads to an increase of the friction. Finally, the maximum opening angle 37 according to FIG. 18 is reached. In some cases the maximum opening angle 37 is not provided by a stop formed by the friction elements 23, 26. However, it is also possible that for the maximum opening angle 37 the outer surface of the friction pin 47 contacts or abuts a corresponding stop formed by the friction element body 18 or the helical surface 24. In some cases also a stop corresponding to that of the embodiment of FIG. 6 is provided.

The helical surface 24 of the friction element 23 does not necessarily have to comprise a constant pitch or inclination.

Instead, the helical surface might also comprise a varying inclination, kinks or steps for influencing the friction conditions.

For the shown embodiments the damping device 38 basing upon friction was arranged in the bearing region 8 of the lid 3 at the base body 2. However, within the frame of the invention it is also possible that the damping device 38 is located remote from the bearing region 8 of the lid 3 at the base body 2.

Preferably, the bearing block 11 has a design such that it is possible to arrange the same bearing block 11 on the right side as well as on the left side so that the number of same parts is increased. Preferably, in particular the accommodation for accommodating the friction element body 25 is located on both sides of the bearing block 11.

It is possible that the maximum opening angle 37 of the lid 3 starting from the closed position is 75°±5°. Preferably, the partially opened angle 33 for which the two friction elements 23, 26 for the first time contact each other is reached for an opening angle 7 of 46°±3°, wherein it is also possible that the partially opened angle varies for different laboratory centrifuges 1 due to tolerances.

Many variations and modifications may be made to the preferred embodiments of the invention without departing substantially from the spirit and principles of the invention. All such modifications and variations are intended to be included herein within the scope of the present invention, as defined by the following claims.

We claim:

1. A laboratory centrifuge comprising
   a) a base body,
   b) a lid being linked to the base body for being pivoted about a pivot axis, and
   c) a damping device which is interposed between the lid and the base body and designed and configured for providing a damping effect for damping a pivoting movement of the lid relative to the base body,
   d) wherein the damping device comprises
      da) a friction element which is held by the base body and
      db) a friction element which is pivoted together with the lid,
   e) the friction elements are pressed against each other with a normal force such that the friction elements produce a friction force providing the damping effect, and
   f) the normal force between the friction elements depends on the opening angle of the lid relative to the base body.

2. The laboratory centrifuge of claim 1, wherein the normal force has at least a force component having an orientation parallel to the pivot axis.

3. The laboratory centrifuge of claim 2, wherein at least one friction element comprises a helical surface extending around the pivot axis.

4. The laboratory centrifuge of claim 3, wherein the helical surface has a slope of 5 to 15 mm.

5. The laboratory centrifuge of claim 1, wherein the normal force has an orientation transverse to the pivot axis.

6. The laboratory centrifuge of claim 5, wherein at least one friction element comprises a cam surface or inner surface extending around the pivot axis, a distance of the cam surface or inner surface from the pivot axis changing in circumferential direction around the pivot axis.

7. The laboratory centrifuge of claim 1, wherein a stop is provided for limiting the pivoting movement of the lid.

8. The laboratory centrifuge of claim 7, wherein the stop is integrally formed by one of the friction elements.

9. The laboratory centrifuge of claim 3, wherein a stop is provided for limiting the pivoting movement of the lid.

10. The laboratory centrifuge of claim 9, wherein the stop is formed by a stop surface which directly follows to the helical surface.

11. The laboratory centrifuge of claim 5, wherein a stop is provided for limiting the pivoting movement of the lid.

12. The laboratory centrifuge of claim 11, wherein the stop is formed by a stop surface which directly follows to the cam surface or inner surface.

13. The laboratory centrifuge of claim 1, wherein the friction element which is held by the base body is formed by a friction element body which is mounted to a bearing block of the base body.

14. The laboratory centrifuge of claim 1, wherein the friction element which is pivoted with the lid is formed by a friction element body which is mounted to the lid.

15. The laboratory centrifuge of claim 14, wherein a bearing lug is formed by the friction element body.

16. The laboratory centrifuge of claim 1, wherein at least one friction element is made of plastic or metal.

17. The laboratory centrifuge of claim 16, wherein at least one friction element is an injection molding part or a milled part.

18. The laboratory centrifuge of claim 1, wherein the friction elements
   a) are arranged with a distance from each other for an opening angle being smaller than a partially opened angle so that there is no normal force between the friction elements,
   b) contact each other for an opening angle which equals the partially opened angle, and
   c) are pressed against each other with a normal force for an opening angle being larger than the partially opened angle for providing the damping effect.

19. The laboratory centrifuge of claim 1, wherein the normal force between the friction elements increases when approaching a maximum opening angle.

20. The laboratory centrifuge of claim 18, wherein the normal force between the friction elements increases when approaching a maximum opening angle.

21. The laboratory centrifuge of claim 1, wherein the friction element which is pivoted with the lid is supported by an elastical region of the lid.

22. The laboratory centrifuge of claim 3, wherein the helical surface has a slope of 8 to 12 mm.

* * * * *